United States Patent
Sheu

(10) Patent No.: US 9,216,757 B2
(45) Date of Patent: Dec. 22, 2015

(54) DRIVERLESS VEHICLE WITH STEERING WHEEL

(71) Applicant: HON HAI PRECISION INDUSTRY CO., LTD., New Taipei (TW)

(72) Inventor: Yi-Zhong Sheu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 71 days.

(21) Appl. No.: 13/965,220

(22) Filed: Aug. 13, 2013

(65) Prior Publication Data

US 2014/0350771 A1    Nov. 27, 2014

(30) Foreign Application Priority Data

May 23, 2013  (TW) .............................. 102118137 A

(51) Int. Cl.
  *G05D 3/00* (2006.01)
  *B62D 1/04* (2006.01)
  *B62D 5/00* (2006.01)

(52) U.S. Cl.
  CPC . *B62D 1/04* (2013.01); *B62D 5/001* (2013.01)

(58) Field of Classification Search
  USPC ................. 701/28, 23, 36; 180/168, 183, 167
  See application file for complete search history.

(56) References Cited

U.S. PATENT DOCUMENTS

2005/0205764 A1*  9/2005  Hoashi ........................... 250/221
2005/0219504 A1* 10/2005  Adachi et al. ................. 356/5.03

* cited by examiner

*Primary Examiner* — Dalena Tran
(74) *Attorney, Agent, or Firm* — Novak Druce Connolly Bove + Quigg LLP

(57) ABSTRACT

A driverless vehicle capable of being steered, and includes a number of driven wheels, a steering linkage assembly, and a steering controlling system. The steering controlling system includes a steering wheel, a number of light receivers, a fixing ring, a number of light emitters, a controller, and a processor. The steering linkage assembly is coupled with the driven wheels and the steering wheel. The light receivers are positioned on the steering wheel. The fixing ring positions the light emitters corresponding to the light receivers. The controller controls only one of the light emitters emitting light rays each time. The processor determines a turning direction and a turning angel according to a location of a current light receiver and a location of a preceding light receiver. The steering wheel steers the driven wheels to turn according to the turning direction and the turning angle.

9 Claims, 3 Drawing Sheets

DRIVERLESS VEHICLE WITH STEERING WHEEL

BACKGROUND

1. Technical Field

The present disclosure relates to a driverless vehicle with steering wheel.

2. Description of Related Art

Currently, a driverless vehicle is used in a factory to carry workpieces. An inducting route is positioned on the ground, the driverless vehicle has a sensor to sense the inducting route, and thus the driverless vehicle can move along the inducting route. However, the inducting route is fixed and not easy to change, thus a moving direction of the driverless vehicle is not easy to change. If there is an obstacle in the inducting route, the driverless vehicle cannot drive around the obstacle.

Therefore, it is desirable to provide a driverless vehicle that can overcome the above-mentioned limitations.

BRIEF DESCRIPTION OF THE DRAWINGS

Many aspects of the embodiments should be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
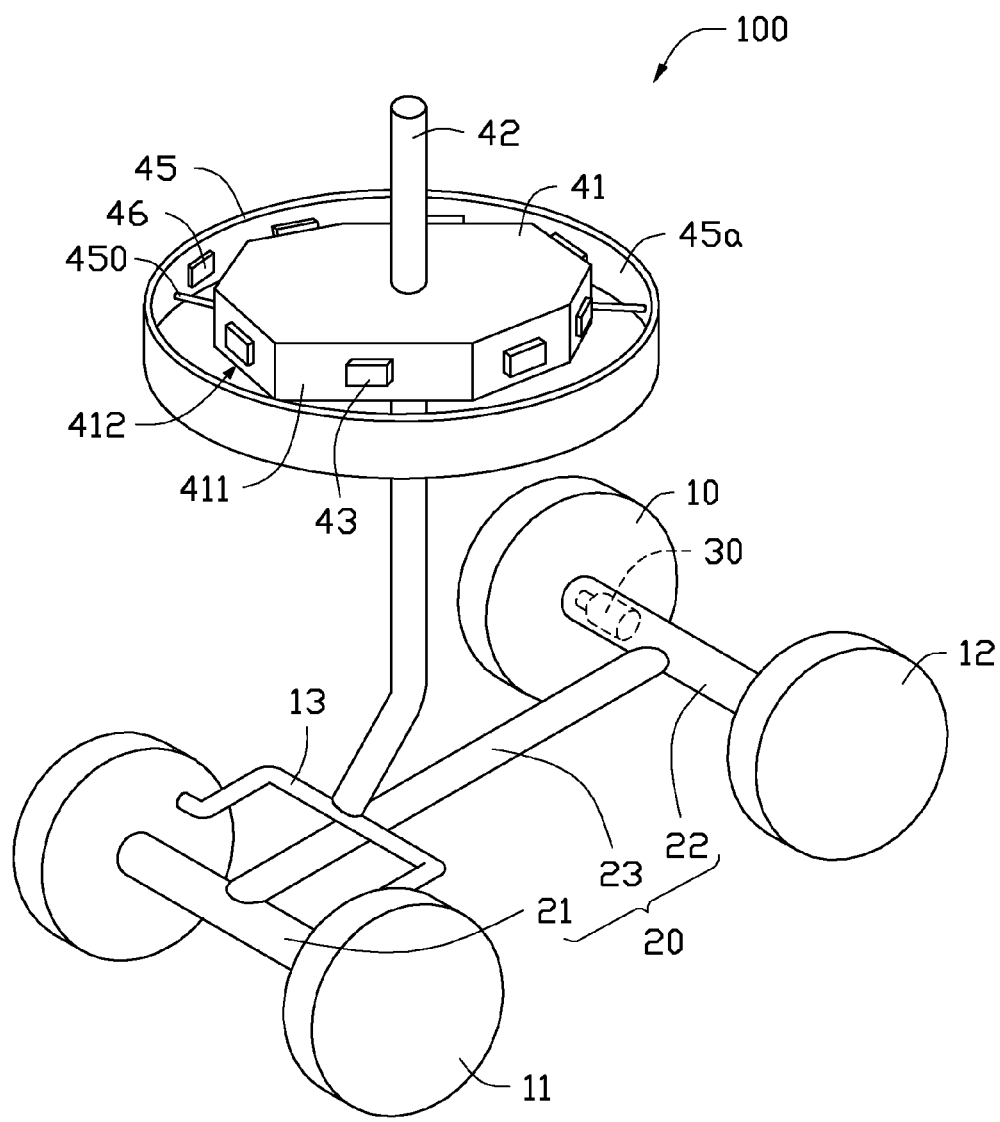
FIG. 1 is a schematic view of a driverless vehicle, including a steering wheel, according to an exemplary embodiment.
Figure 2:
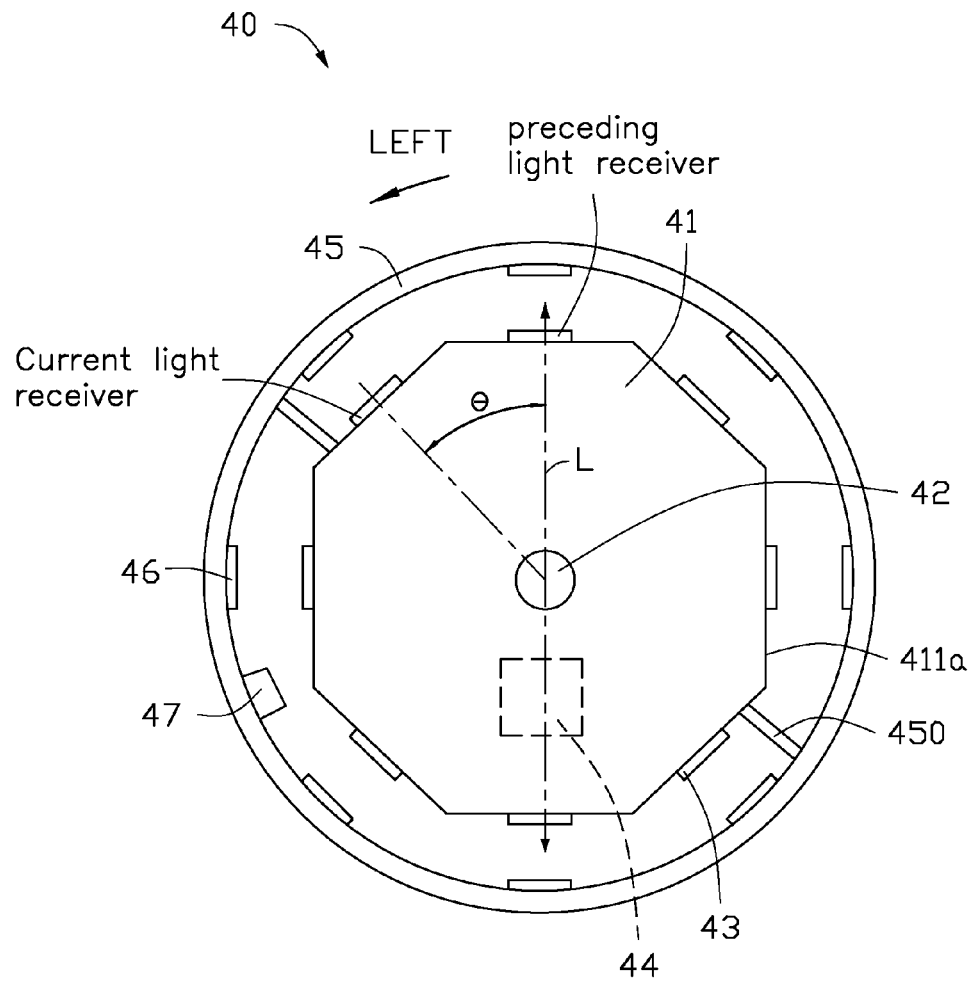
FIG. 2 is a top view of a steering controlling system of the driverless vehicle of FIG. 1, which shows the steering wheel to turn left.

FIG. 1 and FIG. 2 illustrate a driverless vehicle 100 in accordance with an exemplary embodiment. The driverless vehicle 100 includes at least one driven wheel 11, at least one driving wheel 12, a steering linkage assembly 13, a power train assembly 20, a driving device 30, and a steering controlling system 40.

The at least one driven wheel 11 and the at least one driving wheel 12 are rotated to move the driverless vehicle 100. In this embodiment, the number of the at least one driven wheel 11 is two, and the number of the at least one driving wheel 12 is two.

The steering linkage assembly 13 is coupled to the driven wheels 11.

The power train assembly 20 connects the driven wheels 11 and the driving wheels 12 together, and includes a first connecting pole 21, a second connecting pole 22, and a third connecting pole 23. Two opposite ends of the first connecting pole 21 are rotatably connected to the two driven wheels 11. Two opposite ends of the second connecting pole 22 are rotatably connected to the two driving wheels 12. The third connecting pole 23 is fixedly connected to the first connecting pole 21 and the second connecting pole 22.

The driving device 30 is connected to at least one of the driving wheels 12, and is used for driving the at least one of the driving wheels 12 to rotate. Because the at driven wheels 11 and the driving wheels 12 are connected together through the power train assembly 20, the driven wheels 11 can rotate when the at least one driving wheel 12 rotates.

The steering controlling system 40 is used for controlling a turning direction and a turning angle of the driverless vehicle 100, and includes a steering wheel 41, a driving shaft 42, a number of light receivers 43, a processor 44, a fixing ring 45, a number of light emitters 46, and a controller 47.

The steering wheel 41 is coupled to the steering linkage assembly 20, and thus the steering wheel 41 and the steering linage assembly 20 cooperatively change a turning direction and a turning angle of the driven wheels 11. The steering wheel 41 includes an outer side surface 411 and a bottom surface 412 substantially perpendicular to the outer side surface 411.

The driving shaft 42 is fixedly connected the steering wheel 41 to the steering linkage assembly 13, and thus the steering linkage assembly 13 can turn the driven wheels 11 when the steering wheel 41 rotates.

The light receivers 43 are positioned on different positions of the outer side surface 411 of the steering wheel 41, and all at the same height with respect to the bottom surface 412. In this embodiment, the light receivers 43 are equiangularly spaced from each other. Line L in FIG. 2 is a connection line of central points of any two opposite light receivers 43. An included angle between any two adjacent light receivers is θ, θ=360/n, and n stands for number of the light receiver 43.

Figure 3:
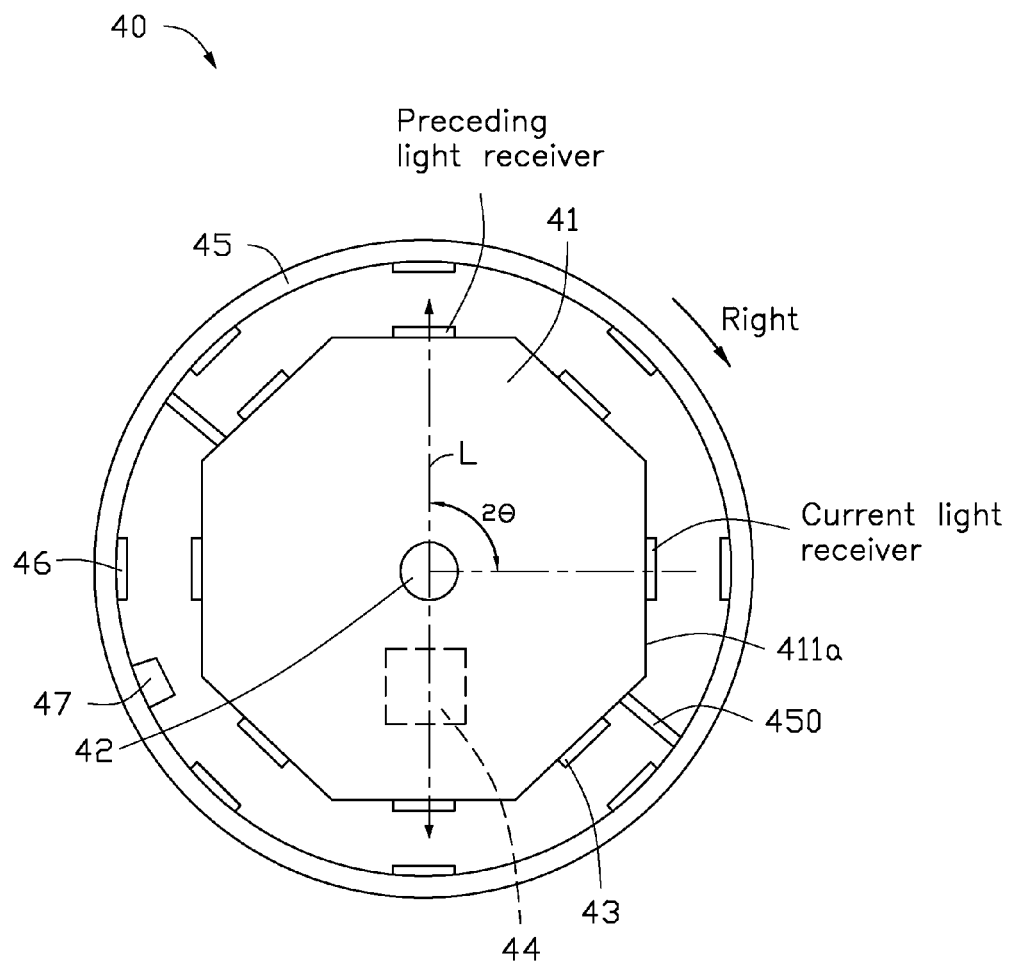
FIG. 3 is a top view of a steering controlling system of the driverless vehicle of FIG. 1, which shows the steering wheel to turn right.

The processor 44 is received in the steering wheel 41, and is electrically connected to the light receivers 43. The processor 44 determines one of the light receivers 43 which receives light rays currently as a current light receiver, and one of the light receivers 43 which receives light rays preceding to the current light receiver as a preceding light receiver. The processor 44 determines a turning direction by comparing a location of the current light receiver on the steering wheel 41 to a location of the preceding light receiver on the steering wheel 41. When the location of the current light receiver is on the left side of the location of the preceding light receiver, the processor 44 determines the steering wheel turns left; when the location of the current light receiver is on the right side of the location of the preceding light receiver, the processor 44 determines the steering wheel turns right. The location of the current light receiver 43 and the location of the preceding light receiver 43 are labeled for an example in FIG. 2 and FIG. 3, and use arrows to indicate the steering wheel to turn left in FIG.2 and to turn right in FIG. 3, respectively. The steering wheel 41 steers the driven wheels 11 to turn according to the determined turning direction and the determined turning angle.

In particular, the processor 44 determines an included angle between the radial directions of the current light receiver 43 and the preceding light receiver 43, and thus to obtain the turning angle. When the processor 44 determines that the location of the current light receiver 43 is on the left side of the location of the preceding light receiver 43, the steering wheel 41 turns left; when the processor 44 determines the location of the current light receiver 43 is on the right side of the location of the preceding light receiver 43, the steering wheel 41 turns right.

The processor 44 is further used for determining a distance of movement of the driverless vehicle 100, and thus the driverless vehicle 100 can be controlled to move a predetermined distance.

In this embodiment, the steering wheel 41 has an octagonal cross section, and the outer side surface 411 has eight planar surfaces 411 a. The number of the light receivers 43 is eight, and each of the eight planar surfaces 411a carries one of the eight light receivers 43. Each light receiver 43 is positioned on a central point of the corresponding planar surface 411a, and thus the included angle between two adjacent light receivers 43 is about 45 degrees.

The fixing ring 45 is ring-shaped, and sleeves the steering wheel 41, and is spaced a distance from the steering wheel 41. The fixing ring 45 is fixedly connected to the steering wheel 41, and thus the fixing ring 45 can rotate following the steering wheel 41. In this embodiment, the fixing ring 45 is fixedly connected to the steering wheel 41 through two fixing poles 450, and the number of the fixing poles 450 is not limited to the two in number of this embodiment.

The fixing ring 45 has an inner side surface 45a facing the outer side surface 411. The light emitters 46 are fixed on the inner surface 45a, and are corresponding to the light receivers 43. Each light emitter 46 is aligned with the corresponding light receiver 43, and thus each light receiver 43 can receive the light rays from the corresponding light emitter 46. In this embodiment, the number of the light emitters 46 is eight, and each of the light receivers 43 can include a solar panel or a photo diode, each of the light emitters 46 can include a laser diode or a light emitting diode.

The controller 47 is electrically connected to the light emitters 46 and the driving device 30, and is used for controlling whether the light emitter 46 emit light rays, and is further used for controlling only one of the light emitters 46 to emit light rays each time towards the corresponding light receiver 43. In this embodiment, the controller 47 is positioned on the fixing ring 45.

In use, when the driverless vehicle 100 needs to be steered, the controller 47 controls one of the light emitters 46 to emit light rays, and the corresponding light receiver 43 receives the light rays. The processor 44 determines the turning direction of the steering wheel 41 according to the location of the current light receiver 43 and determines the turning angle of the steering wheel 41 according to the location of the current light receiver and the location of a preceding light receiver 43. The steering wheel 41 steers the driven wheels 11 to turn according to the determined turning direction and the determined turning angle, thereby steering the driverless vehicle 100. Therefore, the moving direction of the driverless vehicle 100 can be easily changed.

It will be understood that the above particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A driverless vehicle, comprising:
   at least one driven wheel;
   a steering linkage assembly coupled to the at least one driven wheels;
   a steering controlling system comprising:
      a steering wheel coupled to the steering linkage assembly, the steering wheel and the steering linage assembly configured for cooperatively changing a turning direction of the driven wheels;
      a plurality of light receivers equiangularly positioned around an outer side surface of the steering wheel;
      a fixing ring surrounding the steering wheel, and spaced a distance from the steering wheel;
      a plurality of light emitters positioned on an inner surface of the fixing ring, the light emitters being paired with the light receivers and arranged spatially corresponding to the respective light receives, each pair of the light emitter and receiver being aligned with a radially direction of the steering wheel;
      a controller configured for controlling only one of the light emitters to emit light rays each time towards the corresponding light receiver, and
      a processor configured for determining a turning direction of the steering wheel according to a location of a current light receiver which currently receives light rays from the corresponding light emitter and determining a turning angle of the steering wheel, wherein the processor determines one of the light receivers which receives light rays currently as a current light receiver, and one of the light receivers which receives light rays preceding to the current light receiver as a preceding light receiver, the processor determines the turning direction by comparing a location of the current light receiver on the steering wheel to a location of the preceding light receiver on the steering wheel, when the location of the current light receiver is on the left side of the location of the preceding light receiver, the processor determines the steering wheel turns left; when the location of the current light receiver is on the right side of the location of the preceding light receiver, the processor determines the steering wheel turns right; and the processor further determines an included angle between the radial directions of the current light receiver and the preceding light receiver, thus to obtain the turning angle;
   wherein the steering wheel is configured to steer the driven wheels to turn according to the determined turning direction and the determined turning angle.

2. The driverless vehicle of claim 1, wherein the steering wheel comprises a driving shaft coupled to the steering linkage assembly.

3. The driverless vehicle of claim 1, further comprising a power train assembly and at least one driving wheel, wherein the power train assembly comprises a first connecting pole, a second connecting pole, and a third connecting pole, the first connecting pole is rotatably connected to the at least one driven wheel, the second connecting poles is rotatably connected to the at least one driving wheel, and the third connecting pole is fixedly connected to the first connecting pole and the second connecting pole.

4. The driverless vehicle of claim 3, further comprising a driving device, wherein the driving device is configured to drive the at least one driving wheel.

5. The driverless vehicle of claim 1, wherein the processor further is configured for determining a distance of movement of the driverless vehicle.

6. The driverless vehicle of claim 1, wherein the fixing ring has an inner side surface facing the circumferential surface of the steering wheel, the light receivers are positioned on the inner side surface.

7. The driverless vehicle of claim 6, wherein the steering wheel has an octagonal cross section, and the outer side surface has eight planar surfaces, the number of the light receiver is eight, and the eight light receivers are positioned on central points of the corresponding planar surfaces.

8. The driverless vehicle of claim 1, wherein each of the light emitters comprises a laser diode or a light emitting diode.

9. The driverless vehicle of claim 1, wherein each of the light receivers comprises a solar panel or a photo diode.

* * * * *